(12) United States Patent
Kale

(10) Patent No.: US 11,449,250 B2
(45) Date of Patent: Sep. 20, 2022

(54) MANAGING A MODE TO ACCESS A MEMORY COMPONENT OR A LOGIC COMPONENT FOR MACHINE LEARNING COMPUTATION IN A MEMORY SUB-SYSTEM

(71) Applicant: Micron Technology, Inc., Boise, ID (US)

(72) Inventor: Poorna Kale, Folsom, CA (US)

(73) Assignee: Micron Technology, Inc., Boise, ID (US)

(*) Notice: Subject to any disclaimer, the term of this patent is extended or adjusted under 35 U.S.C. 154(b) by 300 days.

(21) Appl. No.: 16/600,895

(22) Filed: Oct. 14, 2019

(65) Prior Publication Data

US 2021/0109668 A1 Apr. 15, 2021

(51) Int. Cl.
*G06F 3/06* (2006.01)
*G06N 20/00* (2019.01)

(52) U.S. Cl.
CPC .......... *G06F 3/0634* (2013.01); *G06F 3/0604* (2013.01); *G06F 3/0659* (2013.01); *G06F 3/0673* (2013.01); *G06N 20/00* (2019.01)

(58) Field of Classification Search
CPC .... G06F 3/0634; G06F 3/0604; G06F 3/0659; G06F 3/0674; G06N 20/00
USPC .......................................................... 713/100
See application file for complete search history.

(56) References Cited

U.S. PATENT DOCUMENTS

| | | | | |
|---|---|---|---|---|
| 5,671,392 A * | 9/1997 | Parris | ...................... | G11C 8/12 711/148 |
| 6,061,285 A * | 5/2000 | Tsukikawa | ............. | G11C 29/14 365/201 |
| 8,295,576 B2 * | 10/2012 | Gadodia | ................ | G16H 15/00 382/132 |
| 9,111,599 B1 * | 8/2015 | Bringivijayaraghavan | ................. | G11C 7/1087 |
| 9,535,623 B1 * | 1/2017 | Lee | ......................... | G11C 29/52 |
| 9,785,345 B2 * | 10/2017 | Zhu | ........................ | G06F 3/0604 |
| 10,423,876 B2 * | 9/2019 | Henry | ..................... | G11C 7/109 365/189.17 |
| 10,545,866 B1 * | 1/2020 | Kato | ........................ | G11C 8/12 711/148 |
| 2004/0093461 A1 * | 5/2004 | Kim | .................. | G11C 11/40618 711/106 |
| 2004/0266419 A1 * | 12/2004 | Arling | ..................... | G08C 25/02 455/92 |
| 2007/0070728 A1 * | 3/2007 | Lee | ...................... | G11C 11/4093 365/191 |

(Continued)

OTHER PUBLICATIONS

Thesaurus.com Synonyms for machine learning and Artificial Intelligence (Year: 2013).*

*Primary Examiner* — Paul R. Myers
(74) *Attorney, Agent, or Firm* — Lowenstein Sandler LLP

(57) ABSTRACT

A first mode setting signal is received from a host system. The first mode setting signal indicates a first mode. A memory component is memory component to the first mode based on the first mode setting signal. In the first mode, memory cells of the memory component are exposed to the host system. A second mode setting signal is received from the host system. The second mode setting signal indicates a second mode. The memory component is set to the second mode based on the second mode setting signal. In the second mode, a machine learning operation component of the memory component is exposed to the host system.

20 Claims, 6 Drawing Sheets

(56) References Cited

U.S. PATENT DOCUMENTS

| | | | |
|---|---|---|---|
| 2007/0234080 A1* | 10/2007 | Mackey | G06F 1/3203 713/300 |
| 2008/0148007 A1* | 6/2008 | Lee | G11C 29/18 711/202 |
| 2008/0159041 A1* | 7/2008 | Okuda | G11C 29/14 365/201 |
| 2008/0172521 A1* | 7/2008 | Lee | G06F 12/0246 711/103 |
| 2008/0195829 A1* | 8/2008 | Wilsey | G06F 12/1433 711/163 |
| 2011/0007583 A1* | 1/2011 | Lee | G11C 7/109 365/189.17 |
| 2012/0317449 A1* | 12/2012 | Kim | G11C 29/10 714/718 |
| 2013/0036254 A1* | 2/2013 | Fai | G06F 11/263 711/103 |
| 2013/0151796 A1* | 6/2013 | Gupta | G06F 13/4234 711/E12.001 |
| 2013/0182522 A1* | 7/2013 | Lim | G11C 11/406 365/222 |
| 2015/0355839 A1* | 12/2015 | Shim | G11C 11/40618 711/103 |
| 2015/0363308 A1* | 12/2015 | Park | G06F 12/0246 711/103 |
| 2017/0293427 A1* | 10/2017 | Kwon | G06F 3/061 |
| 2018/0348838 A1* | 12/2018 | Cox | G06F 3/0634 |
| 2019/0179553 A1* | 6/2019 | Kim | G06F 12/1433 711/163 |
| 2020/0042209 A1* | 2/2020 | Morris | G11C 29/14 365/201 |
| 2021/0042087 A1* | 2/2021 | Pugh | G11C 11/40618 711/106 |
| 2021/0064246 A1* | 3/2021 | Troia | G11C 11/406 365/222 |
| 2021/0081204 A1* | 3/2021 | Jeon | G11C 11/4093 365/191 |

* cited by examiner

MANAGING A MODE TO ACCESS A MEMORY COMPONENT OR A LOGIC COMPONENT FOR MACHINE LEARNING COMPUTATION IN A MEMORY SUB-SYSTEM

TECHNICAL FIELD

Embodiments of the disclosure relate generally to memory sub-systems, and more specifically, relate to managing a mode to access a memory component or a logic component for machine learning computation in a memory sub-system.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
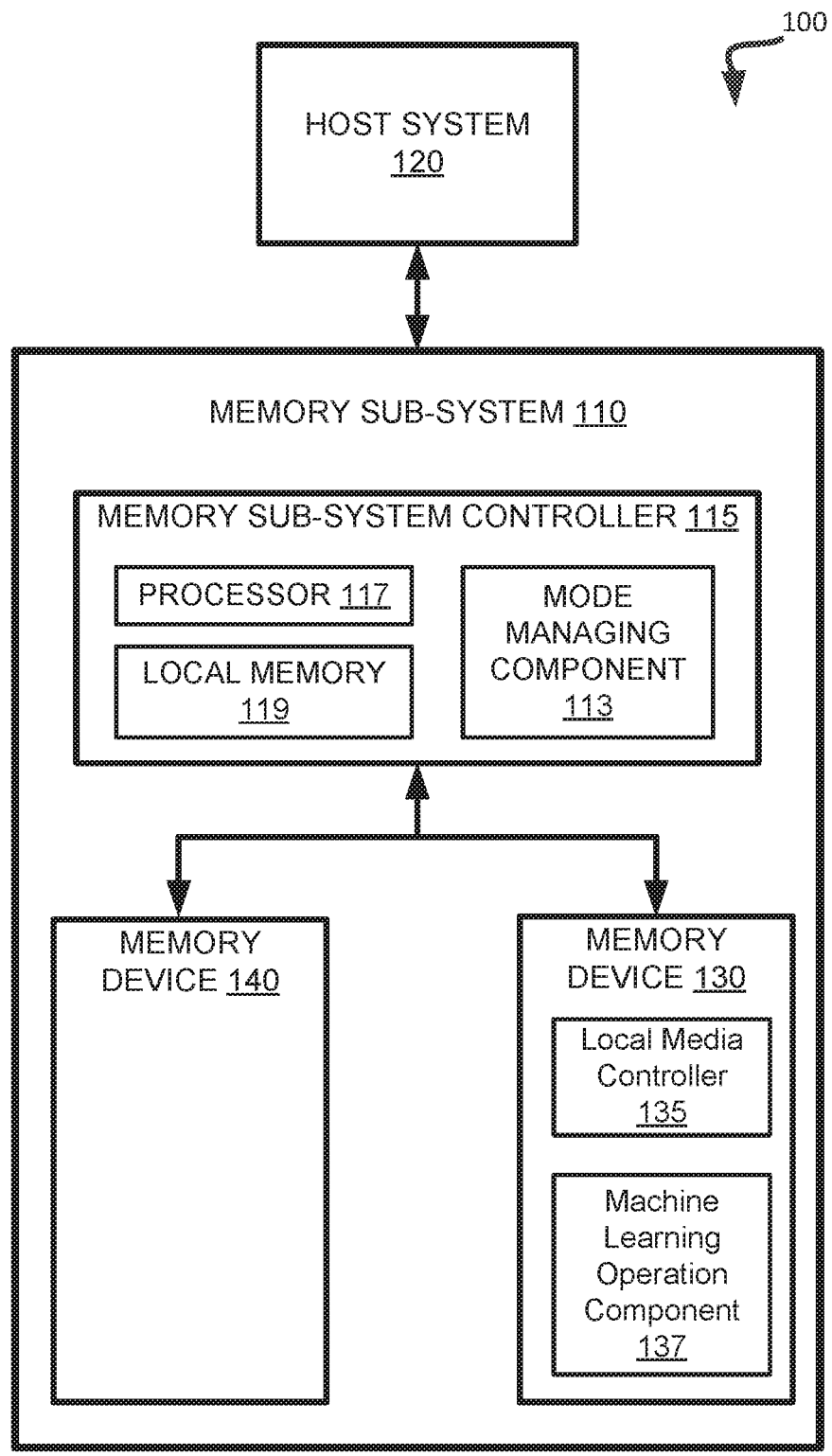
FIG. 1 illustrates an example computing environment that includes a memory sub-system in accordance with some embodiments of the present disclosure.

Aspects of the present disclosure are directed to managing a mode to access a memory component or a logic component for machine learning computation in a memory sub-system. The memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A conventional memory sub-system includes only memory component(s) for storing data provided by the host system. Accordingly, an interface between the host system and the memory sub-system (e.g., a system bus) need only handle data and commands directed to the memory component(s). For example, if a host system transmits a command (e.g., a write command) and corresponding data to the memory sub-system over the system bus, the command and corresponding data are automatically routed to the memory component(s). If, however, the memory sub-system were to include additional components other than the memory component(s), confusion over how to direct commands and/or data received from the host system may arise. Conventional memory sub-systems lack a specific mechanism to determine which of a number of separate components commands and/or data are directed to and to route the commands and/or data to the appropriate component. Accordingly, significant errors can occur as the commands and/or data are likely to be routed to the wrong component.

Aspects of the present disclosure address the above and other deficiencies by having a memory sub-system that provides different modes of operation that enable the host system to access different types of components (e.g., an array(s) of memory cells and a logic component (e.g., logic gates or an array(s) of resistors for performing a machine learning computation)) included in a memory component. The memory sub-system or the memory component of the memory sub-system can operate in one mode for exposing the array(s) of memory cells in the memory component to the host system. In a second mode of operation, the memory sub-system or the memory component can instead expose the logic component disposed on the memory component to the host system.

Advantages of the present disclosure include, but are not limited to, maximizing utilization of the memory sub-system (i.e., a memory component of the memory sub-system) by providing two separate operation modes—one for performing the traditional operation of storing and retrieving data and another one for performing logical operations such as machine learning computation). Moreover, by providing the two separate operation modes, the memory sub-system requires only one interface for the memory component. That is, there is no need to implement two separate interfaces each for the array of memory cells and the logic component in the memory component. Accordingly, the present disclosure simplifies implementation of the logic component in the memory component.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells such as single level cells (SLCs) or multi-level cells (MLCs) (e.g., triple level cells (TLCs) or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 and a machine learning operation component 137. The local media controllers 135 can operate in conjunction with memory sub-system controller 115 to execute operations on one or more memory cells of the memory devices 130. The machine learning operation component 137 can perform a machine learning computation in association with memory cells of the memory devices 130. In some embodiments, the machine learning operation component 137 can be coupled to or physically placed adjacent to the memory cells so that the machine learning operation component 137 can quickly access (and with less power) data needed for the machine learning computation from the memory cells. In other embodiments, the machine learning operation component 137 can be included in the memory sub-system controller 115 or the memory device 140. In some other embodiments, the machine learning operation component 137 can be disposed within the memory sub-system 110 while being external but coupled to both the memory sub-system controller 115 and the memory devices 130 and 140.

The memory sub-system 110 includes a mode managing component 113 that can configure a memory device 130 to operate under a memory operation mode to enable the host system 120 to access an array of memory cells or a machine learning operation mode to enable the host system 120 to access a machine learning operation component 137. In some embodiments, the memory sub-system controller 115 includes at least a portion of the mode managing component 113. For example, the memory sub-system controller 115 can include a processor 117 (processing device) configured to execute instructions stored in local memory 119 for performing the operations described herein. In some embodiments, the mode managing component 113 is a part of the host system 120, an application, or an operating system.

The mode managing component 113 can receive a mode setting signal from the host system 120. In one embodiment, the mode setting signal can indicate either the memory operation mode or the machine learning operation mode. In another embodiment, the mode managing component 113 can determine either the memory operation mode or the machine learning operation mode from the mode setting signal. Then, the mode managing component 113 can set an operation mode of the memory device 130 to the memory operation mode or machine learning operation mode based on the mode setting signal. In the memory operation mode, the mode managing component 113 can expose an array of memory cells of the memory device 130 to the host system 120. In the machine learning operation mode, the mode managing component 113 can expose the machine learning operation component 137 of the memory device 130 to the host system 120. Further details with regards to the operations of the mode managing component 113 are described below.

Figure 2:
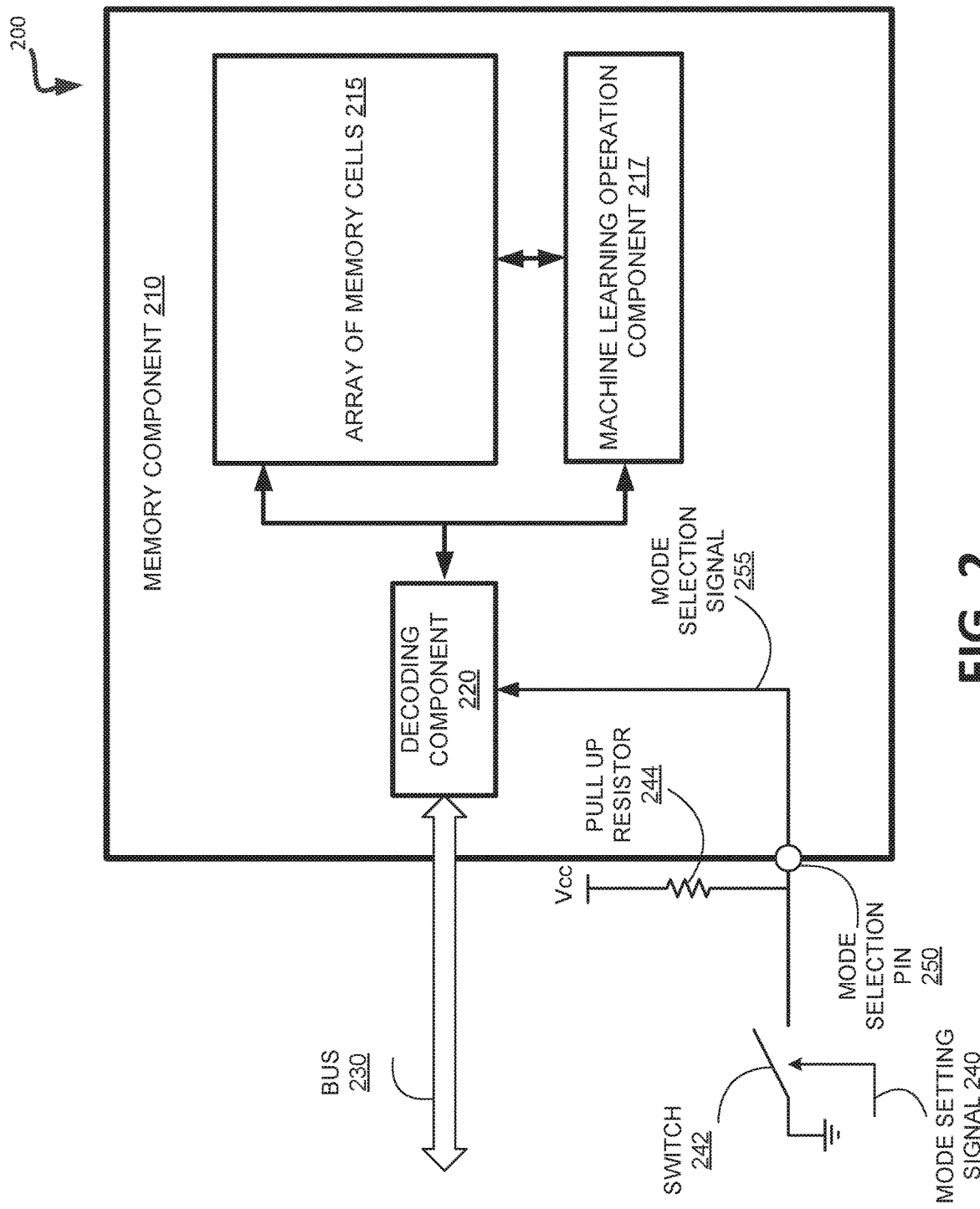
FIG. 2 is a block diagram of an example memory sub-system in accordance with some embodiments of the present disclosure.

FIG. 2 is a block diagram of an example memory sub-system 200 in accordance with some embodiments of the present disclosure. In one embodiment, the memory sub-system 200 includes a memory component 210, a bus 230, a switch 242, and a pull up resistor 244.

The memory component 210 can be a volatile memory device or a non-volatile memory device. In one embodiment, the memory component 210 includes an array of memory cells 215, a machine learning operation component 217, a decoding component 220, and a mode selection pin 250. While the memory component 210 has only one interface (i.e., the bus 230) to the memory sub-system controller or the host system, the memory component 210 can operate under two separate modes—a memory operation mode and machine learning operation mode based on a signal provided through the mode selection pin 250. For example, under the memory operation mode, the memory component 210 exposes the array of memory cells 215 to the host system 120 using mode selection signal 255. Under the machine learning operation mode, the memory component 210 can expose the machine learning operation component 217 to the host system 120 based on a different mode selection signal 255.

The array of memory cells 215 can include memory cells or memory units that are the smallest unit to store data. For example, the memory cells can be SLCs, MLCs, TLCs and/or QLCs. In some embodiments, the memory cells can store data associated with the machine learning computation or any data received from the host system.

The machine learning operation component 217 performs machine learning computation. In some embodiments, the machine learning operation component 217 can be included within the packaging of the memory component 210 or internal to the memory component 210. The machine learning operation component 217 is coupled to the array of memory cells 215 to access data needed to perform the machine learning computation. The machine learning operation component 217 is also coupled to the decoding component 220 to receive execution signal for initiating the machine learning computation. The machine learning computation, in general, is performed for image recognition or classification. The machine learning computation involves processing input data (e.g., a picture in pixels) using a machine learning model and outputs prediction (e.g., classification or probability of the classification) about the input data.

A machine learning model is a mathematical representation for finding patterns in input data and classifying the input data or making other predictions or decisions. Examples of the machine learning model includes deep neural networks, convolutional neural networks, and recurrent neural networks. A neural network can include an input layer for receiving input data, an output layer for generating prediction, and a hidden layer(s), in between the input and output layers, for performing calculations (e.g., multiply-accumulate operations) on the input data to generate the prediction. Each layer is composed of a plurality of neurons or nodes. Each node can be assigned a numerical value and coupled to one or more nodes in the succeeding layer through an edge having an assigned weight value. Accordingly, when advancing from one layer to the next (i.e., from the input layer to hidden layer(s) and to output layer), one or more nodes on the current layer can be coupled with one or more nodes in the next layer. As such, a value of a node in the next layer would correspond to an outcome of the multiply-accumulate operations. For example, for each node on the current layer coupled to a node in the next layer, a product (i.e., multiplication) of a value assigned to the node on the current layer and a weight assigned to a corresponding edge that couples the node of the current layer to the respective node on the next layer is computed and then added (i.e., accumulated).

In some embodiments, the machine learning operation component 217 can correspond to digital logic that is used to execute the machine learning computation. The digital logic can be implemented by using digital logic gates or other such circuitry. For example, the digital logic can be used to implement a machine learning model, to receive input data for the machine learning model, and to store output data for the machine learning model. In some embodiments, the multiply and accumulate operations of the machine learning computation can be performed by the digital logic of the machine learning operation component 217. As such, the machine learning operation component 217 can access the machine learning model and input data stored in the array of memory cells 215 when performing the machine learning computation.

In some other embodiments, the machine learning operation component 217 can correspond to a resistor array. For example, the multiply and accumulate operations of the machine learning computation can be performed by the resistor array of the machine learning operation component 217. Each resistor of the machine learning operation component 217 can represent a node in each layer of the machine learning model and resistance values of the resistors can be programmed or tuned to correspond to a weight value of an edge between a pair of resistors that represents a pair of nodes of the neural network. Input and output of resistors can be used to process the multiply and accumulate operations in the machine learning computation. In some embodiments, the output of the last layer of the machine learning model can be coupled with an analog to digital (ADC) converter to convert one or more analog signals that are the last value(s) of the machine learning model to a digital signal that can be used to represent the output of the machine learning model.

The decoding component 220 decodes an input signal received via the bus 230 and generates a decoded signal. The decoded signal can include more bits than the input signal. The decoding component 220 is coupled to the bus 230 and thus, receives input signal from the memory sub-system controller or the host system 120. Examples of such an input signal can include address, data (e.g., data associated with the machine learning computation, any control signal for setting different modes of the memory component 210, an execution signal for the machine learning computation), and clock signal. The decoding component 220 decodes the input signal generating a decoded signal (e.g., decoded address, decoded data, decoded clock signal) for write and read operation to be performed on the array of memory cells 215 or for performing the machine learning computation by the machine learning operation component 217. Additionally, the decoding component 220 can be coupled to the mode selection pin 250 and receive mode selection signal 255 as an input signal. The decoding component 220 can then generate decoded mode selection signal (not shown). For example, the decoding component 220 can receive the mode selection signal 255 having a value indicating the memory operation mode or the machine learning operation mode (e.g., a low value for the memory operation mode and a high value for the machine learning operation mode). The decoding component 220 can decode the mode selection signal 225 and generate the decoded mode selection signal having two or more bits enabling the host system 120 to access either the array of memory cells 215 or the machine learning operation component 217.

The mode selection pin 250 is an input pin of the memory component 210 configured to provide mode selection signal to the decoding component 220 in association with the switch 242 and pull up resistor 244. In some embodiments, the switch 242 on one end can be coupled to the ground (GND) and on the other end, be coupled to the pull up resistor 244 and the mode selection pin 250. The switch 242 can receive a control signal (i.e., mode setting signal 240) that closes or opens the switch. The mode setting signal 240 can be provided from the host system (e.g., via the memory sub-system controller by the bus 230). The pull up resistor 244 can be a resistor with high resistance (e.g., 10 kΩ). For example, in case the mode setting signal 240 corresponds to a control signal to open the switch 242, the mode selection pin 250 is effectively coupled to the pull up resistor 244. Because the pull up resistor has high resistance and coupled to supply voltage (e.g., Vcc or Vdd), the mode selection pin 250 would receive a relatively high voltage signal (e.g., near 5V) and provide the high voltage signal to the decoding component 220 as the mode selection signal 255 to indicate one of the memory operation mode and machine learning operation mode. On the other hand, in case the mode setting signal 240 is provided to the switch 242 to close the switch, the mode selection pin 250 would be coupled to the GND and to the pull-up resistor 244. As a result, the mode selection pin 250 would receive a relatively low voltage signal (e.g., near 0V) and provide the low voltage signal to the decoding component 220 as the 255 to indicate the other one of the memory operation mode and machine learning operation mode. In some other embodiments, instead of the switch 242, the pull up resistor 244 and the mode selection pin 250 can be coupled to a voltage source that drives the mode selection pin 250 to carry the relatively high voltage signal (as a mode setting signal) for the memory operation mode and the relatively low voltage signal (as a mode setting signal) for setting the memory component 210 to the machine learning operation mode. The voltage source can be controlled by the host system or the memory sub-system controller via the host system.

In further embodiments, the host system can determine what the current operation mode of the memory component 210. For example, the host system can determine the current operation mode by storing the last operation mode requested in a local memory of the host system, or requesting what information about the current operation mode from the memory sub-system controller or the local media controller of the memory component 210. Once the host system has determined the current operation mode of the memory component 210, the host system can determine whether or not to change the operation mode of the memory component 210 depending on a desired operation. In case the host system determines to change the operation mode, the host system can generate an appropriate mode setting signal for a desired mode (either the memory operation mode or the machine learning operation mode). As such, the host system can ensure that the memory component is in the right operation mode and routes data via the bus 230 to the right component (either the array of memory cells 215 or the machine learning operation component 217).

The bus 230 can be a data bus in the memory sub-system 200 that carries signal such as address, data (e.g., data associated with the machine learning computation, any control signal for setting different modes of the memory component 210, an execution signal for the machine learning computation), and clock signal for read and/or write operation or machine learning computation operation to be performed on the memory component 210 depending on an operation mode of the memory component 210. In some embodiments, the bus 230 interfaces the memory sub-system controller and the memory component 210.

Figure 3:
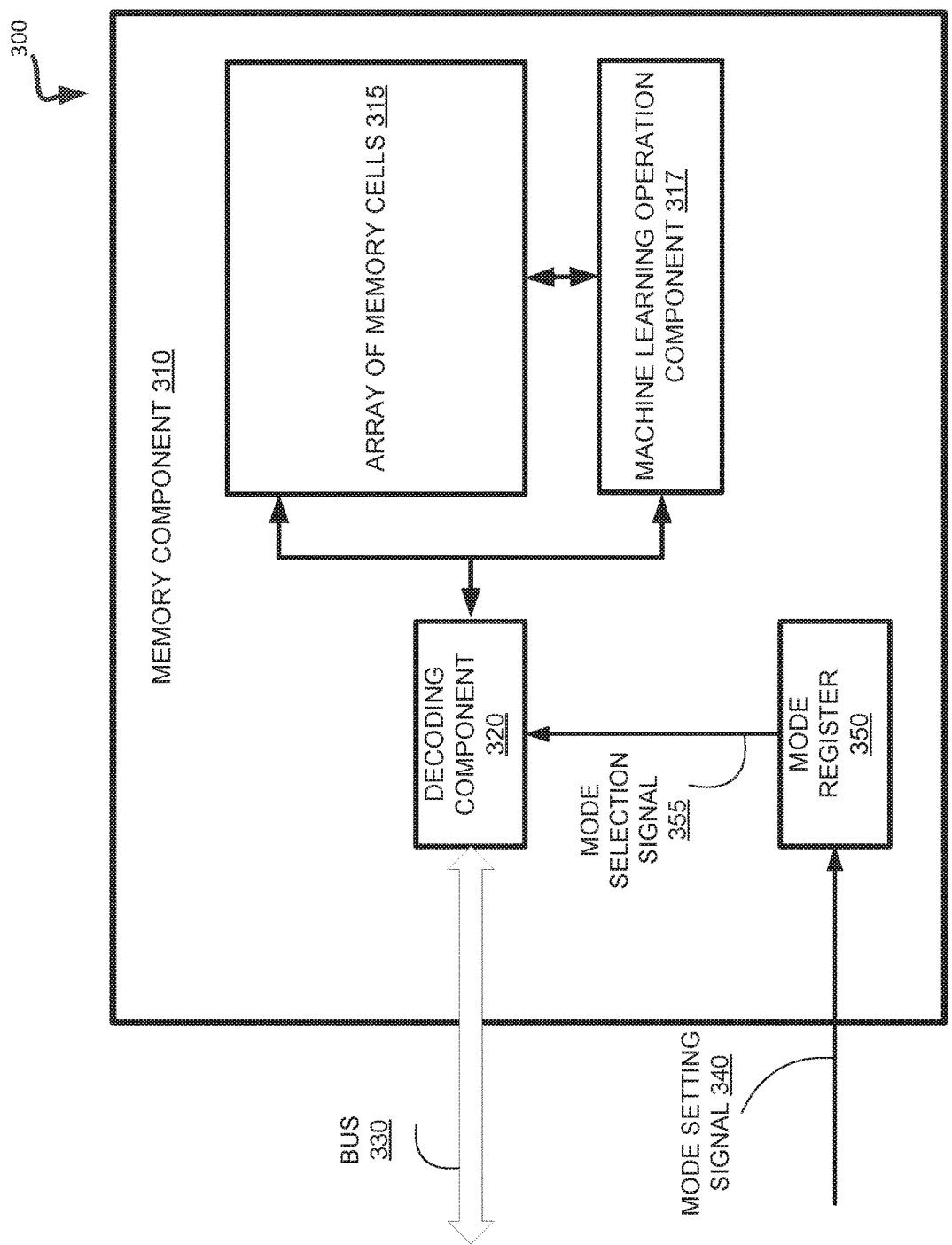
FIG. 3 is a block diagram of an example memory sub-system in accordance with some other embodiments of the present disclosure.

FIG. 3 is a block diagram of an example memory sub-system in accordance with some other embodiments of the present disclosure. In one embodiment, the memory sub-system 300 includes a memory component 310 and a bus 330. Similar to the bus 230 in FIG. 2, the bus 330 can be a data bus in the memory sub-system 300 that carries signal such as address, data, and clock signal for read and/or write operation to be performed on the memory component 310 or for the machine learning computation to be performed by a machine learning operation component 317.

The memory component 310 can be a volatile memory device or a non-volatile memory device. The memory component 310 can include an array of memory cells 315, the machine learning operation component 317, a decoding component 320, and a mode register 350. In some embodiments, the memory component 310 can operate under two separate modes—a memory operation mode and machine learning operation mode. When the memory component 310 operates in the memory operation mode, the memory component 310 can expose the array of memory cells 315 to the host system 120. When the memory component 310 operates in the machine learning operation mode, the memory component 310 can expose the machine learning operation component 317 to the host system 130.

The array of memory cells 315 can include memory cells or memory units that are the smallest unit to store data in the memory operation mode. For example, the memory cells can be SLCs, MLCs, TLCs and/or QLCs.

The machine learning operation component 317 performs machine learning computation. Similar to the machine learning operation component 217 in FIG. 2, the machine learning operation component 317 can be included within the packaging of the memory component 310 or is internal to the memory component 310. In some embodiments, the machine learning operation component 317 can correspond to digital logic that is used to execute machine learning computation. In some other embodiments, the machine learning operation component 317 can correspond to a resistor array.

The decoding component 320 decodes an input signal and generates a decoded signal in a similar manner as the decoding component 220 in FIG. 2. The decoding component 320 is coupled to the bus 330 and thus, receives the input signal (e.g., address, data, clock signal, mode selection signal 355) from the memory sub-system controller or the host system. In response, the decoding component 320 can generate decoded signal (e.g., address, data, clock signal, mode selection signal (not shown)). For example, the decoding component 320 can receive the mode selection signal 355 (e.g., a low value for the memory operation mode and a high value for the machine learning operation mode) and provide the decoded mode selection signal having two or more bits enabling the host system to access either the array of memory cells 315 or the machine learning operation component 317.

The mode register 350 operates to configure a mode of the memory component 310. The mode register 350 can be coupled to the bus 330 or a separate memory control bus (a bus in the memory sub-system carrying control signals) (not shown) to receive a control signal from the memory sub-system controller or the host system. In some embodiments, the control signal can be mode setting signal 340 (e.g., a mode register setting (MRS) command). The MRS command can indicate in which mode (either the memory operation mode or the machine learning operation mode) the memory component 310 should operate. In response, the mode register 350 can generate mode selection signal 355. In some embodiments, the mode selection signal 355 can correspond to a bit(s) that indicates the memory operation mode or machine learning operation mode to the decoding component 320.

In one embodiment, the host system can determine what the current operation mode of the memory component 310 is before providing the mode setting signal. As described above with respect to FIG. 2, the host system can confirm the current operation mode to ensure correct data is routed to the correct component (either the array of memory cells 315 or the machine learning operation component 317). If the memory component 310 does not operate under a desired mode, the host system can provide an appropriate mode setting signal to change the operation mode of the memory component 310.

In further embodiments, the memory component 310 can include both the mode register 350 and a mode selection input pin (e.g., the mode selection pin 250 in FIG. 2). The mode selection input pin would be configured similar to the mode selection pin 250 (i.e., coupled with a switch and a pull up resistor). In such a case, the decoding component 320 can be coupled with both the mode selection input pin and the mode register 350 and receive two separate mode selection signal in a similar manner as described above regarding the FIGS. 2 and 3. For example, for the memory operation mode, the mode register 350 can receive the MRS command indicating the respective mode and provide the corresponding mode selection signal to the decoding component 320. At the same time, the switch associated with the mode selection input pin can be opened so that the mode selection input pin causes high voltage signal (e.g., near 5V) to be supplied to the decoding component 320. On the other hand, while the mode register 350 receives another MRS command for the machine learning operation mode and provide the corresponding mode selection signal to the decoding component 320, the switch can be closed and the mode selection input pin can cause low voltage signal (e.g., near 0V) to be provided to the decoding component 320, for the machine learning operation mode.

Figure 4:
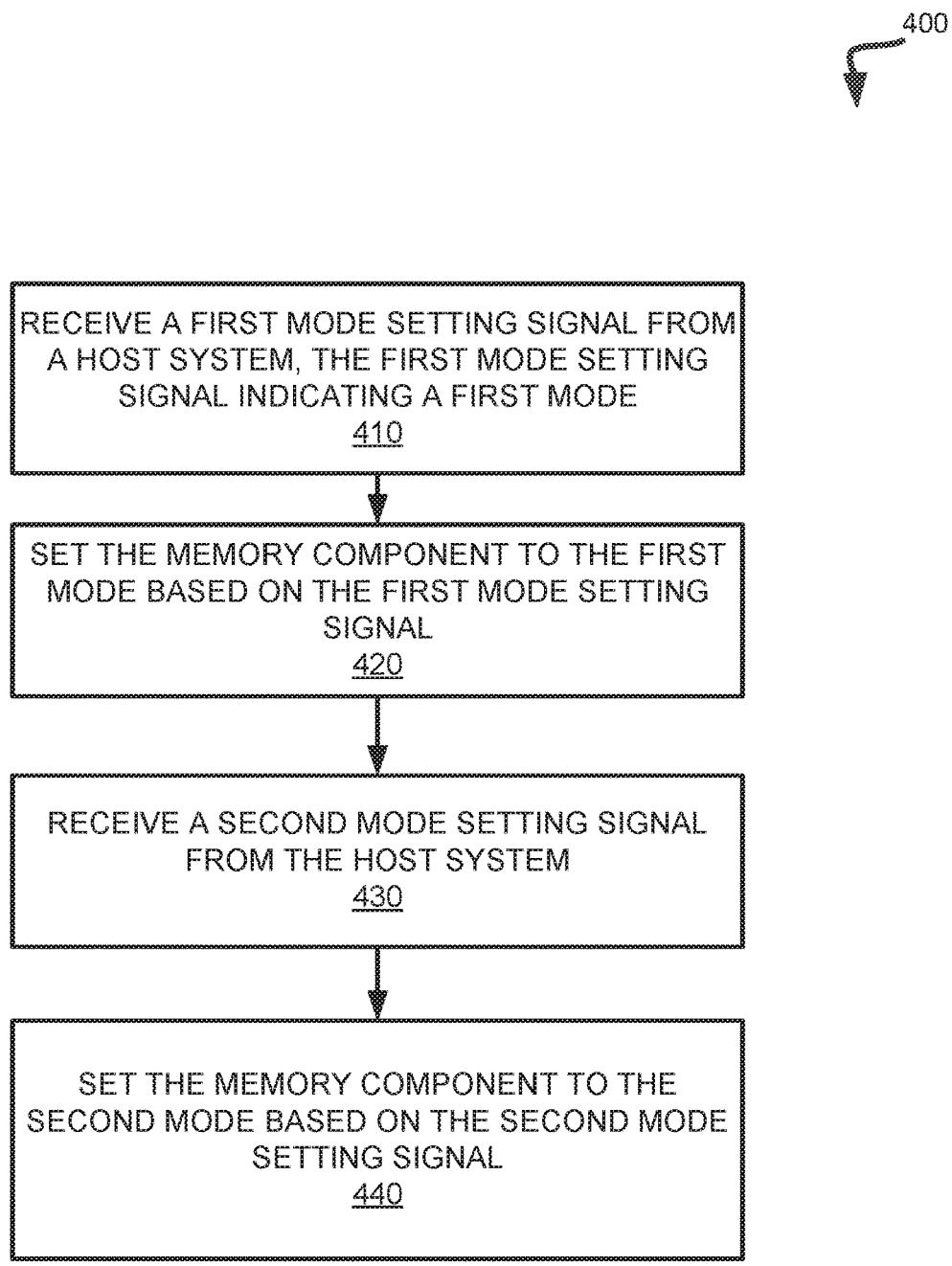
FIG. 4 is a flow diagram of an example method to set a mode of a memory component, in accordance with some embodiments of the present disclosure.

FIG. 4 is a flow diagram of an example method 400 to set a mode of a memory component, in accordance with some embodiments of the present disclosure. The memory component can include an array of memory cells and a machine learning operation component. The array of memory cells are to store data. The machine learning operation component is to perform a machine learning computation in association with the array of memory cells.

The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the mode managing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In performing the method 400, the processing device can be coupled with a memory component of a memory sub system. In some embodiments, such memory component can include an array of memory cells and a machine learning operation component. Memory cells in the array of memory cells can store any data received from the processing device. The machine learning operation component can perform a machine learning computation in association with the array of memory cells. Within a memory component, the machine learning operation component can be coupled to or physically placed adjacent to the array of memory cells so that the machine learning operation component can quickly access (and with less power) data needed for the computation from memory cells in the array.

At operation 410, the processing device receives a mode setting signal from a host system. The mode setting signal can indicate a memory operation mode of a memory component. For example, the mode setting signal can correspond to a series of binary numbers to indicate the memory operation mode (as opposed to a machine learning operation mode). In another example, the mode setting signal can correspond to a control signal that cause voltage signal that satisfies a threshold condition, such as a voltage signal to be above (or below) 2.5V to be supplied to the memory component. Such voltage signal, for example, having a voltage level above 2.5V can indicate the operation mode of the memory component as the memory operation mode. On the other hand, if the mode setting signal does not cause the voltage signal to satisfy the threshold condition, the mode setting signal can be determined to be indicating the machine learning operation mode. Further details of the mode setting signal will be discussed below with respect to operation 420.

At operation 420, the processing device sets the memory component to the memory operation mode based on the mode setting signal. That is, in the memory operation mode, the processing device can expose the array of memory cells of the memory component to the host system. In some embodiments, the host system can provide the mode setting signal to the memory sub-system (i.e., the processing device). The processing device can cause the memory component to operate in the memory operation mode using the mode setting signal.

In some embodiments, the memory component can include a mode selection component and a decoding component. The mode selection component can provide a mode selection signal to select either the first mode or second mode for the memory component. The processing device can cause the mode selection component to provide an appropriate mode selection signal based on the mode setting signal. For example, the mode selection component can receive the mode setting signal that indicates the memory operation mode and provide a mode selection signal selecting the memory operation mode based on the mode setting signal (and vice versa for the machine learning operation mode). In some embodiments, the mode selection component can provide mode selection signal representing '0' for the memory operation mode and '1' for the machine learning operation mode. In some other embodiments, the mode selection signal can be a voltage signal (e.g., a voltage signal having a voltage value above 2.5V) that represents the memory operation mode selected (whereas, a voltage signal having a voltage value equal to or below 2.5V can represent the machine learning operation mode).Accordingly, depending on the mode selection signal, the mode selection component can configure the decoding component to enable the host system to access either the array of memory cells (e.g., in the memory operation mode) or the machine learning operation component (e.g., in the machine learning operation mode) using the mode selection signal. As such, the mode selection component can indicate a selected mode to the decoding component.

In some embodiments, the mode selection component can include a dedicated pin (i.e., an input pin of the memory component dedicated for mode selection) of the memory component to provide a mode selection signal to a decoding component. For example, the dedicated pin can be coupled with a pull up resistor. The pull up resistor can be provided on the memory sub-system outside of the memory component. The pull up resistor can be a resistor with high resistance (e.g., 10 kΩ). The pull up resistor can cause the dedicated pin to provide a mode selection signal to the decoding component.

In some embodiments, the dedicated pin can be coupled to the pull up resistor as well as to a switch that can couple the dedicated pin and the pull up resistor to the ground (GND). The pull up resistor can be coupled to the dedicated pin on one end and to supply voltage (Vcc) on the other end (See FIG. 2 or 3). The processing device can provide the mode setting signal as a control signal to open or close the switch. When the switch is open, the dedicated pin is effectively coupled to the pull up resistor. Because the pull up resistor has high resistance and coupled to Vcc, the voltage drop across the pull up resistor is relatively small, resulting nearly 5V voltage supplied to the dedicated pin. On the other hand, the processing device can provide the mode setting signal that closes the switch. When the switch is closed, the dedicated pin would be coupled to the ground as well as to the pull-up resistor. In this case, the pull up resistor would pass a small amount of current through the closed switch to ground, resulting in a low voltage around 0V to be supplied to the dedicated pin.

Accordingly, when the processing devices provides a mode setting signal (e.g., a control signal that opens the switch, a voltage signal (e.g., a high voltage signal having a voltage value near 5V) satisfying a threshold condition (e.g., a signal having a voltage level above 2.5V) is supplied to the dedicated pin via the pull up resistor, thereby setting the operation mode to the memory operation mode. The dedicated pin can provide the high voltage signal as a mode selection signal indicating the memory operation mode to the decoding component. When the processing devices provides a different mode setting signal (e.g., a control signal causing a voltage signal (e.g., low voltage signal having a voltage value near 0V) not satisfying a threshold condition (e.g., a signal having a voltage level above 2.5V)) that closes the switch, the dedicated pin of the memory component receives, via the pull-up resistor, a low voltage signal having a voltage value near 0V. The dedicated pin can provide the low voltage signal as a mode selection signal indicating the machine learning operation mode to the decoding component.

In other embodiments, the mode selection component can include a mode register. The mode register can be coupled to a memory control bus (a bus in the memory sub-system carrying control signals) or a data bus (e.g., the bus 230 in FIG. 2 or bus 330 FIG. 3) to receive a control signal from the processing device, such as the mode setting signal (e.g., a mode register setting (MRS) command). The MRS command can include certain command signals such as /CS (Chip Select), /RAS (Row Address Strobe), /CAS (Column Address Strobe), and /WE (Write Enable)) to indicate to which mode the memory component should be set. In response to receiving an MRS command, the mode register can generate corresponding mode selection signal (e.g., control signal in bits indicating either the memory operation mode or machine learning operation mode). Accordingly, the mode register can provide the mode selection signal to the decoding component.

The decoding component of the memory component can decode the received mode selection signal and generate a decoded mode selection signal (e.g., the decoded mode selection signal includes more bits than the mode selection signal) that enables the host system to access the array of memory cells or the machine learning operation component. In some embodiments, the decoded mode selection signal can be two bits (whereas the mode selection signal has one bit—'0' for the memory operation mode and '1' for the machine learning operation mode). For the memory operation mode, the decoded mode selection signal can be provided to the array of memory cells or a local controller of the memory component so that the host system can access the array of memory cells. For the machine learning operation mode, the decoded mode selection signal can be provided to the machine learning operation component or the local controller of the memory component so that the host system can access the machine learning operation component. As such, the mode selection signal from the mode selection component can be used to enable the array of memory cells or the machine learning operation component of the memory component to be accessed by the host system.

At operation 430, the processing device receives another mode setting signal from the host system. The mode setting signal can indicate a machine learning operation mode of a memory component. For example, the mode setting signal can be an MRS command pre-defined for the machine learning operation mode. In another example, the mode setting signal can be control signal that causes voltage signal having a voltage level below, for example, 2.5V (i.e., not satisfying the threshold condition—voltage signal to be above 2.5V) to be supplied to the memory component (via the dedicated pin of the memory component).

At operation 440, the processing device sets the memory component to the machine learning operation mode based on the mode setting signal received at operation 430. The mode setting signal can indicate the machine learning operation mode. Thus, the processing device can expose the machine learning operation component of the memory component to the host system. Similar to operation 420, the processing device can provide an MRS command indicating the machine learning operation mode to the mode selection component (i.e., the mode register 250 in FIG. 2) to the memory component so that the memory component can be set to the machine learning operation mode. In some other embodiments, the processing device can transmit the control signal for closing a switch to the switch (i.e., the switch 242 in FIG. 2) that is coupled to the mode selection component (i.e., the mode selection input pin 250 in FIG. 2). Based on the mode setting signal, the mode selection component can provide appropriate mode selection signal (in this case, the mode selection signal selecting the machine learning operation mode having a voltage lever near 0V) to the decoding component. Accordingly, the mode selection component can configure the decoding component to enable the host system to access the machine learning operation component (e.g., in the machine learning operation mode).

Figure 5:
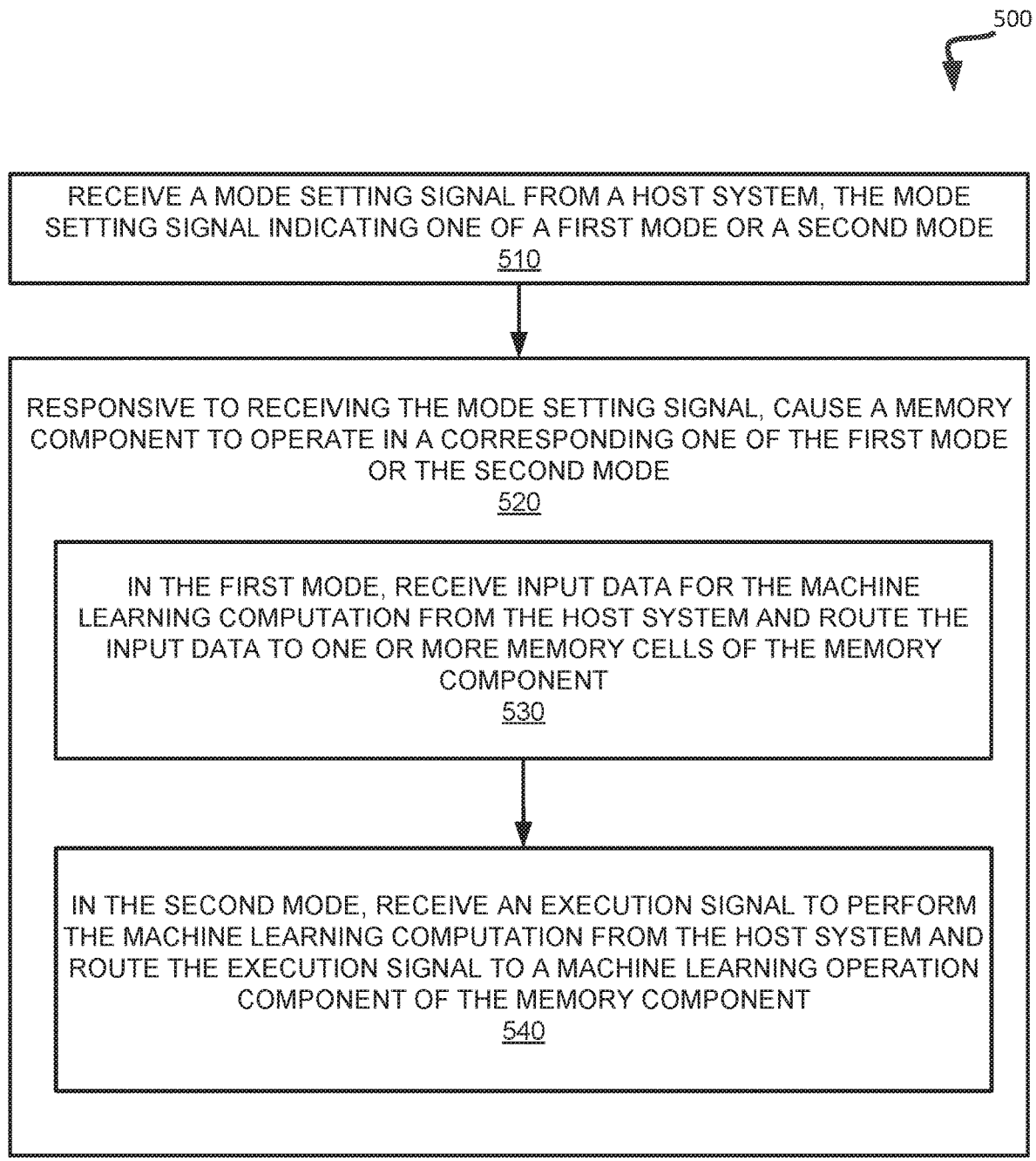
FIG. 5 is a flow diagram of an example method to operate a memory component in different modes, in accordance with some embodiments of the present disclosure.

FIG. 5 is a flow diagram of an example method 500 to operate a memory component in different modes, in accordance with some embodiments of the present disclosure. The memory component can include an array of memory cells and a machine learning operation component. The array of memory cells are to store data. The machine learning operation component is to perform a machine learning computation in association with the array of memory cells.

The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the mode managing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device receives a mode setting signal from a host system. As described above with respect to FIG. 4, the mode setting signal can indicate either the memory operation mode or machine learning operation mode. In some embodiments, the mode setting signal indicating the memory operation mode and the mode setting signal indicating the machine learning operation mode can correspond to control signals that cause voltage signals having different voltage levels (e.g., approximately 0V and 5V) to be supplied to the memory component (via the dedicated pin of the memory component). In some other embodiments, the mode setting signal indicating the memory operation mode and the mode setting signal indicating the machine learning operation mode can correspond to different mode register setting (MRS) commands.

At operation 520, the processing device, responsive to receiving the mode setting signal, causes the memory component to operate in one of the memory operation mode or the machine learning operation mode. For example, the host system can communicate with the processing device to perform an image recognition on a picture of an animal using a deep-neural network model to determine a type of animal species and/or a probability of a subject of the picture being the type of the animal species. To initiate the image recognition, the host system can first coordinate with the memory component (i.e., the array of memory cells in the memory component) to store pixel data of the picture in the memory operation mode. Then, the host system can request the memory component (i.e., the machine learning operation component) to perform the image recognition on the pixel data and provide a result (e.g., a type of animal species—"cat" and/or a probability of the subject in the picture being a "cat"—0.97) of the image recognition in the machine learning operation mode. Accordingly, the processing device can receive the mode setting signal for the memory operation mode from the host system at operation 510. Then, at operation 520, the processing device can cause the memory component to operate in the memory operation mode and store the pixel data. Subsequently, the processing device can receive the mode setting signal for the machine learning operation mode from the host system. Then, at operation 520, the processing device can cause the memory component to operate in the machine learning operation mode and perform the machine learning computation. In some embodiments, the processing device can only receive the mode setting signal indicating the machine learning operation mode for performing the machine learning computation. In such a case, the host system can provide the processing device a machine learning computation execution request together with the input data.

In the memory operation mode, at operation 530, the processing device receives input data from the host system for machine learning computation. In some embodiments, the input data can be in a form of pixel data representing a picture to be processed for an image recognition via the machine learning computation. In addition, in the memory operation mode, the processing device routes the input data to memory cells in the array of memory cells of the memory component for write operation.

In the machine learning operation mode, at operation 540, the processing device receives an execution signal to perform the machine learning computation (e.g., the image recognition) from the host system. In some embodiments, the execution signal can indicate a type of model (e.g., a deep neural network model) and the input data (e.g., the picture of an animal) to be used for the machine learning computation. In some other embodiments, the execution signal can additionally include the input data.

Also, at operation 540, the processing device routes the execution signal to the machine learning operation component of the memory component. In response, the machine learning operation component can initiate the machine learning computation by accessing and loading the indicated model and the input data from the array of memory cells based on the execution signal. In some embodiments, the processing device can instead provide the address of the model and the input data to the machine learning operation component along with or as a part of the execution signal. After processing the input data through the model (i.e., performing the multiply-accumulate operations on the input data), the machine learning operation component can provide output data (e.g., a category of the input data (e.g., a type of animal species—"cat") and/or a probability of the input data belonging to the category (e.g., 0.97)) to an output buffer of the memory component associated with the machine learning operation component. Accordingly, the processing device can detect that the machine learning operation component has generated output data from the machine learning computation by accessing the output buffer. Then, the processing device can provide the output data to the host system. In case the execution signal includes the input data, the machine learning operation component can first store the input data in the array of memory cells before performing the machine learning computation.

In further embodiments, the memory component can switch to the memory operation mode after operating in the machine learning operation mode in response to receiving another mode setting signal for the memory operation mode from the host system while operating in the machine learning operation mode. For example, if an estimated execution time does not satisfy a threshold condition (e.g., less than 2 milliseconds), the processing device can receive another mode setting signal for the memory operation mode so that the processing device can expose the array of memory cells for the host system while waiting for completion of the machine learning computation. During the waiting period, in the memory operation mode, the processing device can enable the host system to access execution codes or operation system stored in the array of memory cells. Upon detecting that the output data of the machine learning computation is ready, the processing device can notify the host system of the completion. In response, the host system can provide a mode setting signal for the machine learning operation mode to the processing device so that the host system can access the output data. The processing device can detect the completion of the machine learning computation by determining that the output data is stored in the output buffer associated with the machine learning operation component.

Figure 6:
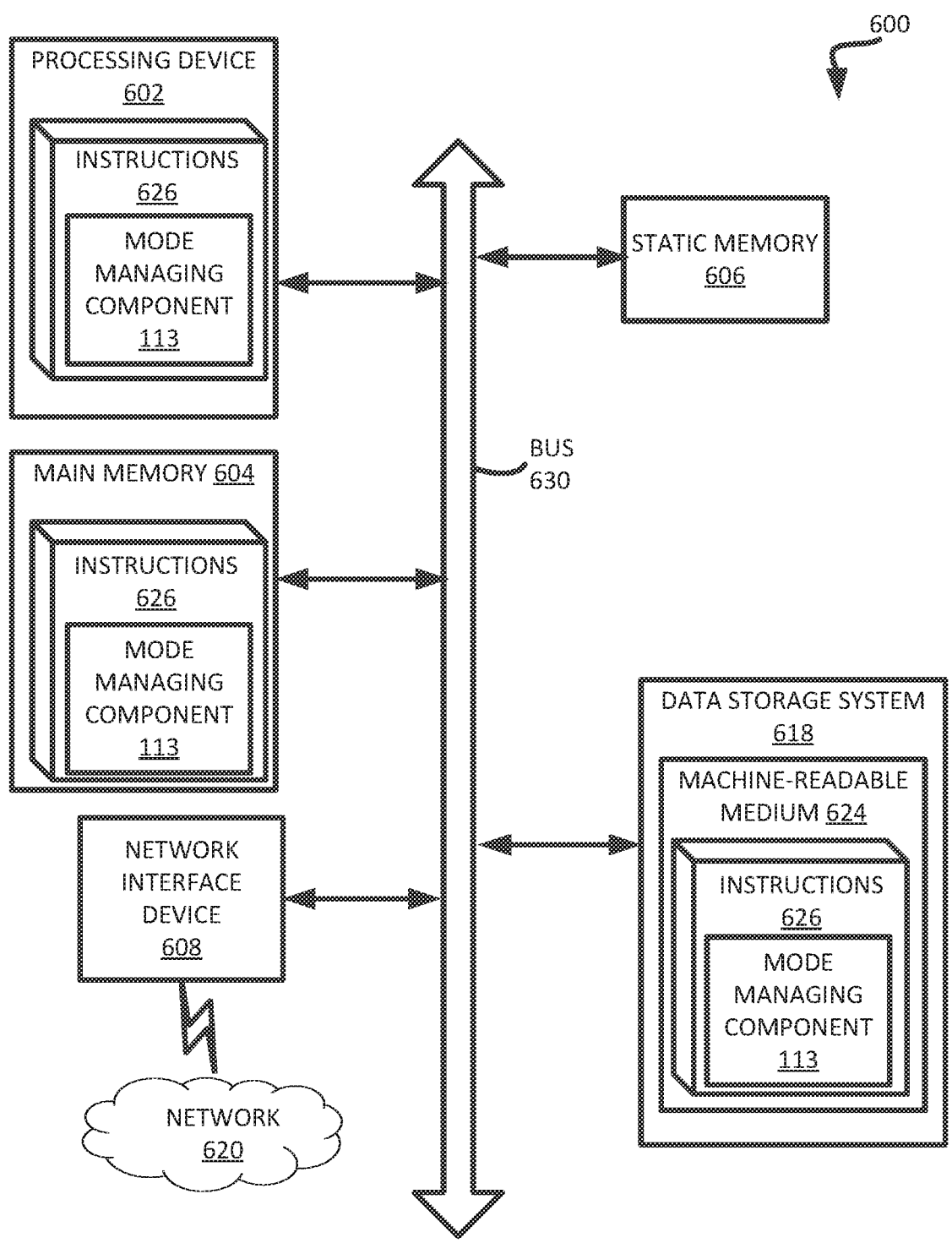
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the mode managing component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a mode managing component (e.g., the mode managing component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component, the memory component including an array of memory cells and a machine learning operation component, the machine learning operation component to perform a machine learning computation in association with the array of memory cells; and
a processing device, operatively coupled with the memory component, to:
receive a first mode setting signal from a host system, the first mode setting signal indicating a first mode;
set the memory component to the first mode based on the first mode setting signal, wherein in the first mode, the processing device exposes the array of memory cells of the memory component to the host system and routes input data from the host system to the array of memory cells of the memory component;
receive a second mode setting signal from the host system, the second mode setting signal indicating a second mode; and
set the memory component to the second mode based on the second mode setting signal, wherein in the second mode, the processing device exposes the machine learning operation component of the memory component to the host system.

2. The system of claim 1, wherein the memory component further comprises:
a mode selection component that provides a mode selection signal to indicate either the first mode or second mode for the memory component; and
a decoding component coupled with the mode selection component, the decoding component to enable the host system to access the array of memory cells or the machine learning operation component based on the mode selection signal from the mode selection component.

3. The system of claim 2, wherein:
to set the system to the first mode based on the first mode setting signal, the processing device is to:
cause the mode selection component to provide a first mode selection signal based on the first mode setting signal to the decoding component of the memory component, wherein the first mode selection signal represents the first mode, and the decoding component enables the host system to access the array of memory cells based on the first mode selection signal selecting the first mode; and
to set the system to the second mode based on the second mode setting signal, the processing device is to:
cause the mode selection component to provide a second mode selection signal based on the second mode setting signal to the decoding component of the memory component, wherein the second mode selection signal represents the second mode, and the decoding component enables the host system to access the machine learning operation component based on the second mode selection signal.

4. The system of claim 3, wherein the mode selection component includes a mode register.

5. The system of claim 4, wherein the first mode setting signal and second mode setting signal correspond to mode register setting (MRS) commands.

6. The system of claim 3, wherein the mode selection component includes an input pin dedicated for mode selection and the memory component further includes a pull up resistor and a switch that are coupled to the input pin.

7. The system of claim 6, wherein:
the first mode setting signal corresponds to a switch control signal to open the switch causing a voltage signal having a voltage level satisfying a threshold condition to be provided to the input pin as the first mode selection signal; and
the second mode setting signal corresponds to a switch control signal to close the switch causing a voltage signal having a voltage level not satisfying the threshold condition to be provided to the input pin as the second mode selection signal.

8. A non-transitory computer readable storage medium comprising instructions that, when executed by a processing device operative coupled with a memory component, cause the processing device to:
receive a first mode setting signal from a host system, the first mode setting signal indicating a first mode;
set the memory component to the first mode based on the first mode setting signal, wherein the memory component includes an array of memory cells and a machine learning operation component, the machine learning operation component to perform a machine learning computation in association with the array of memory cells and wherein in the first mode, the processing device exposes the array of memory cells of the memory component to the host system;
receive a second mode setting signal from the host system, the second mode setting signal indicating a second mode; and
set the memory component to the second mode based on the second mode setting signal, wherein in the second mode, the processing device exposes the machine learning operation component of the memory component to the host system and routes an execution signal from the host system to the machine learning operation component of the memory component.

9. The non-transitory computer readable storage medium of claim 8, wherein the memory component further includes:
a mode selection component that provides a mode selection signal to indicate either the first mode or second mode for the memory component; and
a decoding component coupled with the mode selection component, the decoding component to enable the host system to access the array of memory cells or the machine learning operation component based on the mode selection signal from the mode selection component.

10. The non-transitory computer readable storage medium of claim 9, wherein:
to set the system to the first mode based on the first mode setting signal, the processing device is to:
cause the mode selection component to provide a first mode selection signal based on the first mode setting signal to the decoding component of the memory component, wherein the first mode selection signal represents the first mode, and the decoding component enables the host system to access the array of memory cells based on the first mode selection signal selecting the first mode; and
to set the system to the second mode based on the second mode setting signal, the processing device is to:
cause the mode selection component to provide a second mode selection signal based on the second mode setting signal to the decoding component of the memory component, wherein the second mode selection signal represents the second mode, and the decoding component enables the host system to access the machine learning operation component based on the second mode selection signal.

11. The non-transitory computer readable storage medium of claim 10, wherein the mode selection component includes a mode register.

12. The non-transitory computer readable storage medium of claim 11, wherein the first mode setting signal and second mode setting signal correspond to mode register setting (MRS) commands.

13. The non-transitory computer readable storage medium of claim 10, wherein the mode selection component includes an input pin dedicated for mode selection and the memory component further includes a pull up resistor and a switch that are coupled to the input pin.

14. The non-transitory computer readable storage medium of claim 13, wherein:
the first mode setting signal corresponds to a switch control signal to open the switch causing a voltage signal having a voltage level satisfying a threshold condition to be provided to the input pin as the first mode selection signal; and
the second mode setting signal corresponds to a switch control signal to close the switch causing a voltage signal having a voltage level not satisfying the threshold condition to be provided to the input pin as the second mode selection signal.

15. A system comprising:
a memory component, the memory component including an array of memory cells and a machine learning operation component, the machine learning operation component to perform a machine learning computation in association with the array of memory cells; and
a processing device, operatively coupled with the memory component, to:
receive a mode setting signal from a host system, the mode setting signal indicating one of a first mode or a second mode; and
responsive to receiving the mode setting signal, cause the memory component to operate in a corresponding one of the first mode or the second mode, wherein:
in the first mode, the processing device is to receive input data for the machine learning computation from the host system and route the input data to one or more memory cells in the array of memory cells of the memory component and
in the second mode, the processing device is to receive an execution signal to perform the machine learning computation from the host system and route the execution signal to the machine learning operation component of the memory component.

16. The system of claim 15, wherein the execution signal indicates a type of model and the input data to be used for the machine learning computation.

17. The system of claim 16, wherein in the second mode, the processing device is to further:
provide a corresponding address of the type of model and the input data stored in one or more memory cells of the array of memory cells to the machine learning operation component.

18. The system of claim 15, wherein in the second mode, the processing device is to further:

responsive to detecting that the machine learning operation component has generated output data from the machine learning computation, provide the output data to the host system.

19. The system of claim 15, wherein the mode setting signal indicating the first mode and the mode setting signal indicating the second mode cause two voltage signals having different voltage levels to be supplied to the memory component.

20. The system of claim 15, wherein the mode setting signal indicating the first mode and the mode setting signal indicating the second mode correspond to different mode register setting (MRS) commands.

* * * * *